United States Patent [19]
Tee et al.

[11] Patent Number: 5,956,033
[45] Date of Patent: Sep. 21, 1999

[54] DOCUMENT CONTROL INTERFACE AND METHOD FOR GRAPHICAL MESSAGE DOCUMENT SOFTWARE

[75] Inventors: Cynthia C. Tee, Bellevue; Warren L. Burch, Redmond; Elise M. Gruber; Linnea M. Granryd, both of Seattle; Sherry Larson-Holmes, Seattle, all of Wash.

[73] Assignee: Microsoft Corporation, Remond, Wash.

[21] Appl. No.: 08/563,660

[22] Filed: Nov. 28, 1995

[51] Int. Cl.⁶ .................................................. G06T 1/00
[52] U.S. Cl. ............................................ 345/349; 707/500
[58] Field of Search ................................ 395/348, 349, 395/350, 774; 345/348–50, 356–357; 707/513, 500

[56] References Cited

U.S. PATENT DOCUMENTS

| | | | |
|---|---|---|---|
| 5,333,255 | 7/1994 | Damouth | 395/350 |
| 5,392,387 | 2/1995 | Fitzpatrick et al. | 395/350 |
| 5,600,563 | 2/1997 | Cannon et al. | 364/468.24 |
| 5,612,719 | 3/1997 | Beernink et al. | 345/173 |
| 5,847,707 | 12/1998 | Hayashida | 345/348 |

OTHER PUBLICATIONS

Fellers, Page Design with QuarkXPress 3.1 for Windows, SYBEX Inc., pp. 29–35, 40–41, 66–67, 117–118, 1993.
Parker, Microsoft Office 4 for Windows for Dummies, IDG Books Worldwide, Inc., pp. 35–37, 122–123, 1994.
Quattro Pro for Windows, Borland International, pp. 8–9, 14–15, 89–90, 248–251, Dec. 1992.

*Primary Examiner*—Joseph H. Feild
*Attorney, Agent, or Firm*—Klarquist Sparkman Campbell Leigh & Whinston, LLP

[57] ABSTRACT

The present invention includes a document control interface method for graphical message document computer software. The method is performed by a computer system executing graphical message document software for creating relatively brief documents, such as greeting cards, having relatively simple text and graphics elements. The method includes providing a user with an iconographic interface that allows a user to access directly selected portions of a graphical message document. A preferred embodiment of this invention includes rendering a selection icon for each of multiple pages of a graphical message document being edited. Each of the selection icons is separately selectable by a user with a conventional input device, such as a mouse or some other cursor control device.

19 Claims, 4 Drawing Sheets

DOCUMENT CONTROL INTERFACE AND METHOD FOR GRAPHICAL MESSAGE DOCUMENT SOFTWARE

FIELD OF THE INVENTION

The present invention relates to computer software for creating graphical message documents such as greeting cards and, in particular, to a document control user interface and method for such computer software.

BACKGROUND AND SUMMARY OF THE INVENTION

Documents of various types can be created on personal computers with the different document creation software that is available. Word processing software allows creation of large, complex text documents. Graphics processing software allows creation of graphics images of varying complexity. Desktop publishing software allows significant text documents to be merged with graphics images to create professional-style published documents.

Software is now available for creating graphical message documents such as greeting cards, brochures, and other short, simple documents having relatively simple graphics components and brief text components. Unlike desktop publishing software, which typically is directed to business uses by professionals, graphical message document software is directed to personal uses and allows extensive manipulation of relatively small amounts of text and graphics within the particular document format.

One aspect of graphical message document software is that it typically allows users to create documents only with predefined configurations. This contrasts with prior conventional word processing, graphics, and desktop publishing software, which allow creation of documents with generally arbitrary configurations, including the number of pages. Despite this significant difference, conventional graphical message document software includes the same user interface tools used by more generalized types of document creation software.

With reference to selecting a particular page or portion of a document, conventional graphical user interfaces employ a sequential or scrolling interface model. A user moves from one portion of a document to another by scrolling past all intervening portions of the document. The scrolling typically is in increments of display lines, display screens, or document pages. Conventional graphical user interfaces employ a similar model for image display magnification or zooming (i.e., increasing or decreasing the magnification of a document being displayed). In these applications, a user can zoom within a document portion by incrementally increasing or decreasing the display image magnification. The zooming typically is in fixed percentage increments (e.g., one or five percent) relative to a default image size.

Such generalized user interface models are relatively useful for documents with arbitrary configurations. Sequential accessing of document portions or magnifications is relatively simple and conceptually clear for many users. A disadvantage, however, is that such interface models are relatively cumbersome. A user typically must scan past all intervening portions of the document to move from a current portion to another portion and similarly must scan through all intermediate magnifications when zooming.

For relatively short creative documents, such as graphical message documents like greeting cards, conventional sequential interface models are less than ideal for several reasons. Creative documents frequently undergo revision or modification in a non-linear sequence. A conventional sequential interface model requires the user to scan past undesired document portions or magnifications to access desired portions or magnifications. This is inefficient and burdensome. Moreover, the adaptability of conventional sequential interface models for documents of arbitrary configuration is generally unnecessary for graphical message documents, which typically have relatively constrained configurations.

SUMMARY OF THE INVENTION

The present invention includes a document control interface method for graphical message document computer software. The method is performed by a computer system executing graphical message document software for creating relatively brief documents, such as greeting cards, having relatively simple text and graphics elements.

The method includes providing a user with an iconographic interface that allows the user to access directly selected portions of a graphical message document. A preferred embodiment of this invention includes rendering a selection icon for each of multiple pages of a graphical message document being edited. Each of the selection icons is separately selectable by a user with a conventional input device, such as a mouse or some other cursor control device.

The selection icons are rendered on a computer display screen simultaneously with a selected page of the graphical message document. To identify the page that is rendered, the selection icon for that page is distinguished from the other selection icons by, for example, distinctive highlighting or coloring.

Another aspect of this invention includes rendering simultaneously with the selection icons a document icon for selectively rendering multiple, preferably all, pages of the graphical message document simultaneously. The document icon represents, therefore, a magnification different from that of the selection icons. The document icon and selection icons provide a user interface that combines selection of portions of a document with selection of the magnification of the displayed image of the document.

The document and selection icons of this invention provide a direct-access user interface. By selecting any of the document or selection icons, a user can access a particular portion (e.g., page) or magnification of a document without passing sequentially through undesired portions or magnifications. This direct-access interface utilizes the relatively constrained configurations of documents created by graphical message document software to provide selection icons for specific pages or magnifications.

Another benefit of this invention is that page selection and image zooming are merged into a single interface model. In contrast, conventional graphical user interface models process page selection and zooming as separate features that are separately activated. The present invention provides the functionality of what is typically two separate document viewing interfaces with a single interface model and method.

The foregoing and other features and advantages of the preferred embodiment of the present invention will be more readily apparent from the following detailed description, which proceeds with reference to the accompanying drawings.

DETAILED DESCRIPTION OF PREFERRED EMBODIMENTS

Figure 1:
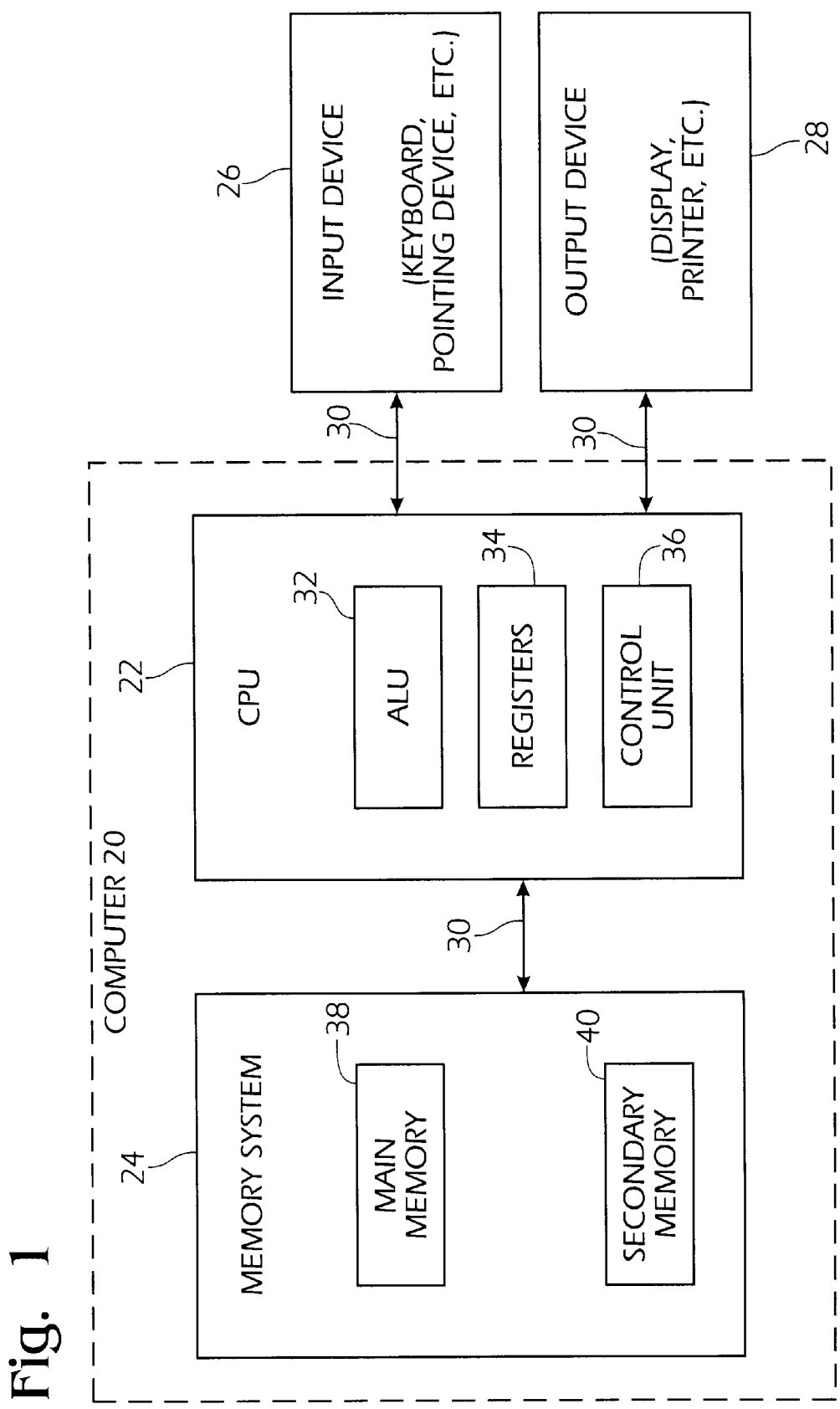
FIG. 1 is a block diagram of a computer system used for the preferred embodiment of this invention.

Referring to FIG. 1, an operating environment for the preferred embodiment of the present invention is a computer system 20 that comprises at least one high speed processing unit (CPU) 22, in conjunction with a memory system 24, an input device 26, and an output device 28. These elements are interconnected by a bus structure 30.

The illustrated CPU 22 is of familiar design and includes an ALU 32 for performing computations, a collection of registers 34 for temporary storage of data and instructions, and a control unit 36 for controlling operation of the system 20. CPU 22 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 24 includes main memory 38 and secondary storage 40. Illustrated main memory 38 takes the form of 8 or 16 megabytes of semiconductor RAM memory. Secondary storage 40 takes the form of long term storage, such as ROM, optical or magnetic disks, flash memory, or tape. Those skilled in the art will know of alternative components.

The input and output devices 26, 28 are also familiar. The input device 26 can comprise a keyboard, a mouse, a physical transducer (e.g., a microphone), etc. The output device 28 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program, such as one implementing the present invention, is the set of software that performs a task desired by the user and makes use of computer resources made available through the operating system. Both are resident in the illustrated memory system 24.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 24, as well as other processing of signals. The memory locations where data bits are maintained are physical locations that have particular electrical, magnetic, or optical properties corresponding to the data bits.

In a preferred embodiment, the present invention is implemented as an application for creating greeting cards in connection with the BOB(™) personal software product of Microsoft Corporation. As a result, graphical user interface components such as dialog boxes, push-button controls, and text editors, are generated by user interface tools resident within the BOB(™) personal software product. It will be appreciated, however, that any of a variety of user interface techniques or tools may be used in accordance with the present invention without departing from the underlying principles thereof.

Figure 2:
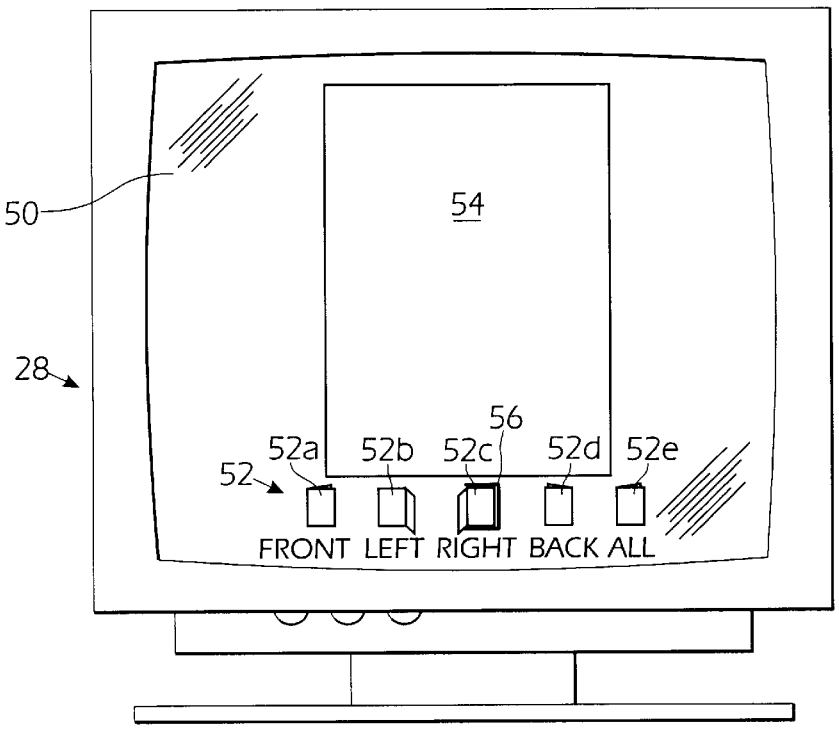
FIG. 2 is a front view of a computer monitor display screen on which document selection icons of the present invention are rendered.

FIG. 2 shows a display screen 50 of a video display monitor output device 28 of computer system 20 with document control selection icons 52 of the present invention rendered thereon. As a preferred embodiment, selection icons 52a, 52b, 52c, 52d, and 52e represent, respectively, the front cover, inside left page, inside right page, rear cover, and all pages of an exemplary side or french fold greeting card.

Selection icon 52e is sometimes referred to as a document icon to distinguish it from icons 52a–52d, which correspond to individual portions of a document. Selection icon 52e represents a magnification different from that of selection icons 52a–52d. In particular, all the document pages rendered with selection of icon 52e preferably fit into a display image size that is the same as that in which document portions are rendered with selection of icons 52a–52d. Accordingly, selection icons 52a–52e provide a user interface that combines selection of document portions with selection of the magnification of the displayed image of the document.

Different selection icons 52 or groups of them preferably are used for different greeting card configurations, as described below in greater detail. Selection icons 52 are rendered simultaneously with a selected portion or page 54 of the greeting card. As shown in FIG. 2, selected page 54 is the inside right page of the greeting card and corresponds to interface icon 52c, which is modified highlighting 56 to identify selected page 54. It will be appreciated that modification of selection icons 52 corresponding to selected pages 54 can alternatively or additionally include color changes, brightness changes, or shape or size changes.

Figure 3A:
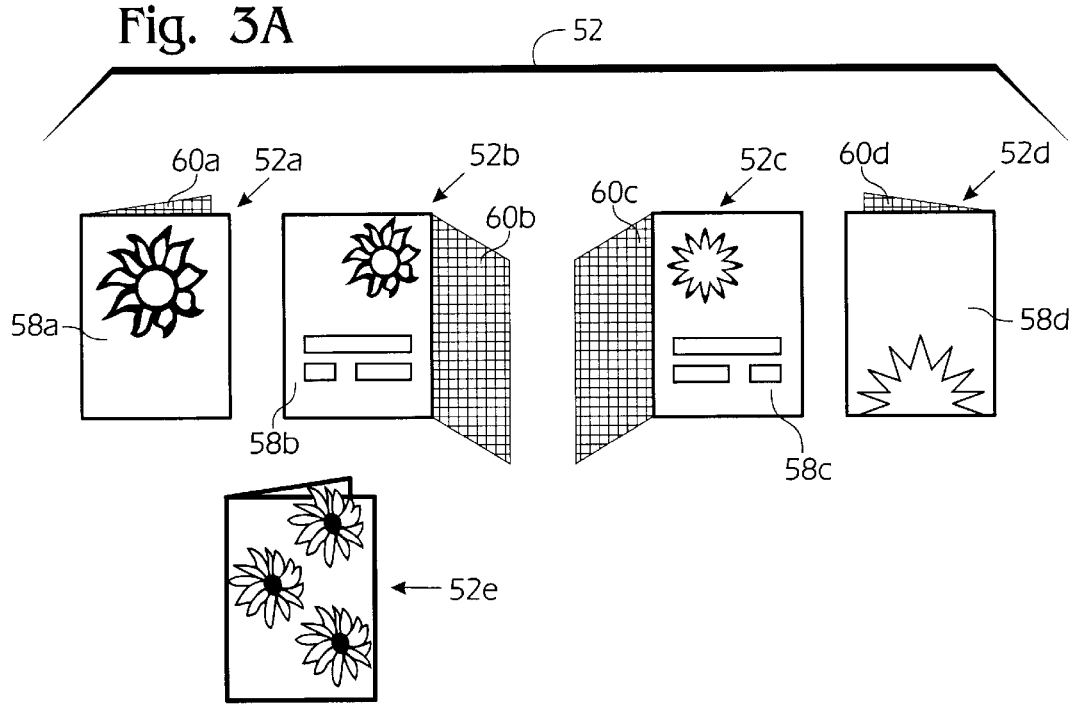
FIGS. 3A and 3B are stylized representations of preferred documents control icons corresponding to side-fold and top-fold greeting cards, respectively.

FIG. 3A is a stylized representation of document selection icons 52 corresponding to a standard side or french-fold greeting card. Preferably, selection icons 52 rendered on display screen 50 include multiple display colors.

Selection icons 52a–52d each show a side-fold greeting card at least partly open to facilitate identification of designated portions or pages 58a–58d respectively. More specifically, the designated page 58a–58d in each of respective selection icons 52a–52d is rendered with a generally plan orientation to show a text or graphic feature and is outlined in bold. Non-designated pages 60a–60d in respective selection icons 52a–52d are rendered at generally angled orientations relative to designated pages 58a–58d and are filled with shadowing (represented by cross-hatching). All-page selection icon 52e is similar to selection icon 52a for front cover 58a, but includes enhanced graphic features for differentiation from selection icon 52a.

Figure 3B:
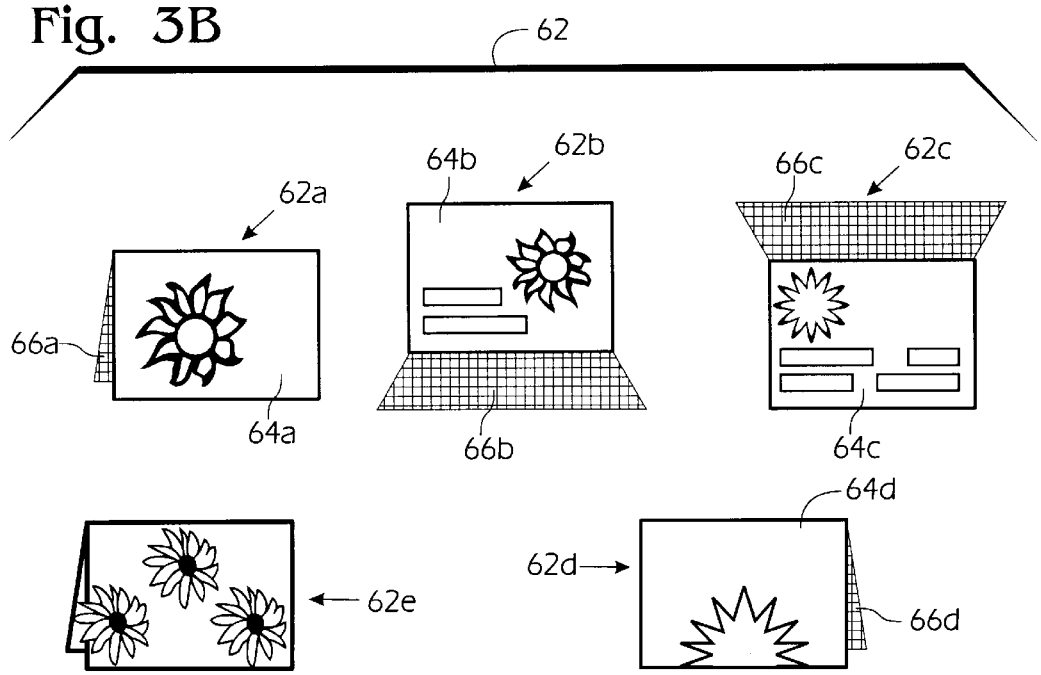

FIG. 3B is a stylized representation of document selection icons 62 corresponding to a standard top-fold greeting card. Preferably, selection icons 62 rendered on display screen 50 include multiple display colors.

Selection icons 62a–62d each show a top-fold greeting card at least partly open to facilitate identification of designated portions or pages 64a–64d respectively. More specifically, the designated page 64a–64d in each of respective selection icons 62a–62d is rendered with a generally plan orientation to show a text or graphic feature and is outlined in bold. Non-designated pages 66a–66d in respective selection icons 62a–62d are rendered at generally angled orientations relative to designated pages 64a–64d and are filled with shadowing (represented by cross-hatching). All-page selection icon 62e is similar to selection icon 62a for front cover 64a, but includes enhanced graphic features for differentiation from selection icon 62a.

Figure 4:
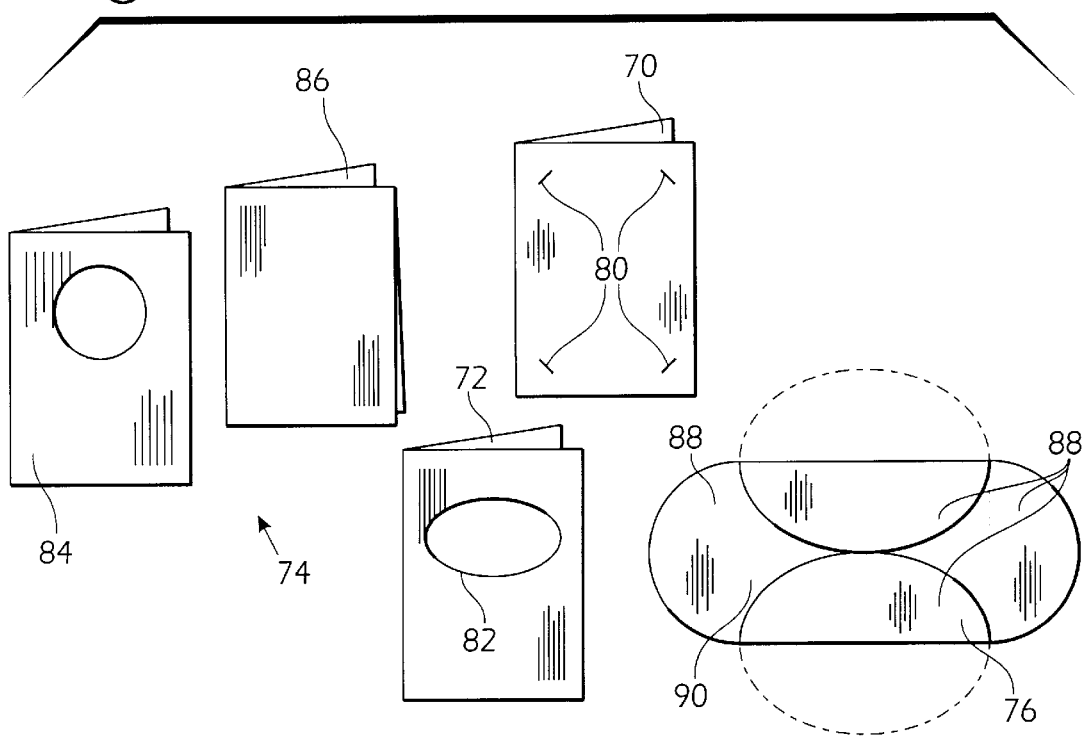
FIG. 4 is a simplified diagrammatic view of four special fold card types that utilize the preferred embodiment of this invention.

The side- and top-fold greeting card formats described above are only two of the several greeting card formats preferably available from greeting card creation software incorporating the present invention. Other "special" greeting card formats preferably are also supported. With reference to FIG. 4, other supported greeting card formats include a photo greeting card type 70, a die-cut card type 72, a two-part card type 74, and a self mailer card type 76. Paper for these special card types preferably is available from a specialty paper supplier such as, for example, PaperDirect, Inc. of Secaucus, N.J.

Referring to FIG. 4 photo greeting card type 70 includes four diagonal die-cut slits 80 into which the corners of a photograph (not shown) can be inserted and supported on the cover page of the card. Photo greeting card type 70 may be selected with a side fold (as shown) or a top fold (not shown). Die-cut window card type 72 includes a window 82 on the front cover of the card. Preferably, window 82 is of an oval shape, and cards of type 72 are only of the side fold type.

Two-part card type 74 includes a cover card 84 and a separate inner card 86, the latter preferably being a conventional french fold type. Cover card 84 and inner card 86 are separately selectable by the user. Such card kits preferably form only side fold cards. Self mailer card type 76 includes flaps 88 that fold together to enclose an inner card portion 90. Different card types have associated with them different features that are modified by a user, particularly with regard to the "special" card types, not all pages are modifiable by a user. Preferably, selection icons 52 or 62 are rendered only for the user-modifiable portion of greeting card. Table 1 lists the selection icons 52 or 62 preferably rendered for each greeting card type shown in FIG. 4.

TABLE 1

| Card Type | Selection Icons |
| --- | --- |
| Standard side- or french-fold | 52a–52e |
| Standard top fold | 62a–62e |
| Two part card, side fold, inner | 52a–52e |
| Two part card, side fold, cover | 52a, 52d, 52e |
| Die-cut window card | 52b, 52c, 52e |
| Photo card | 52b, 52c, 52e |
| Self-mailer card | 52e |

Figure 5:
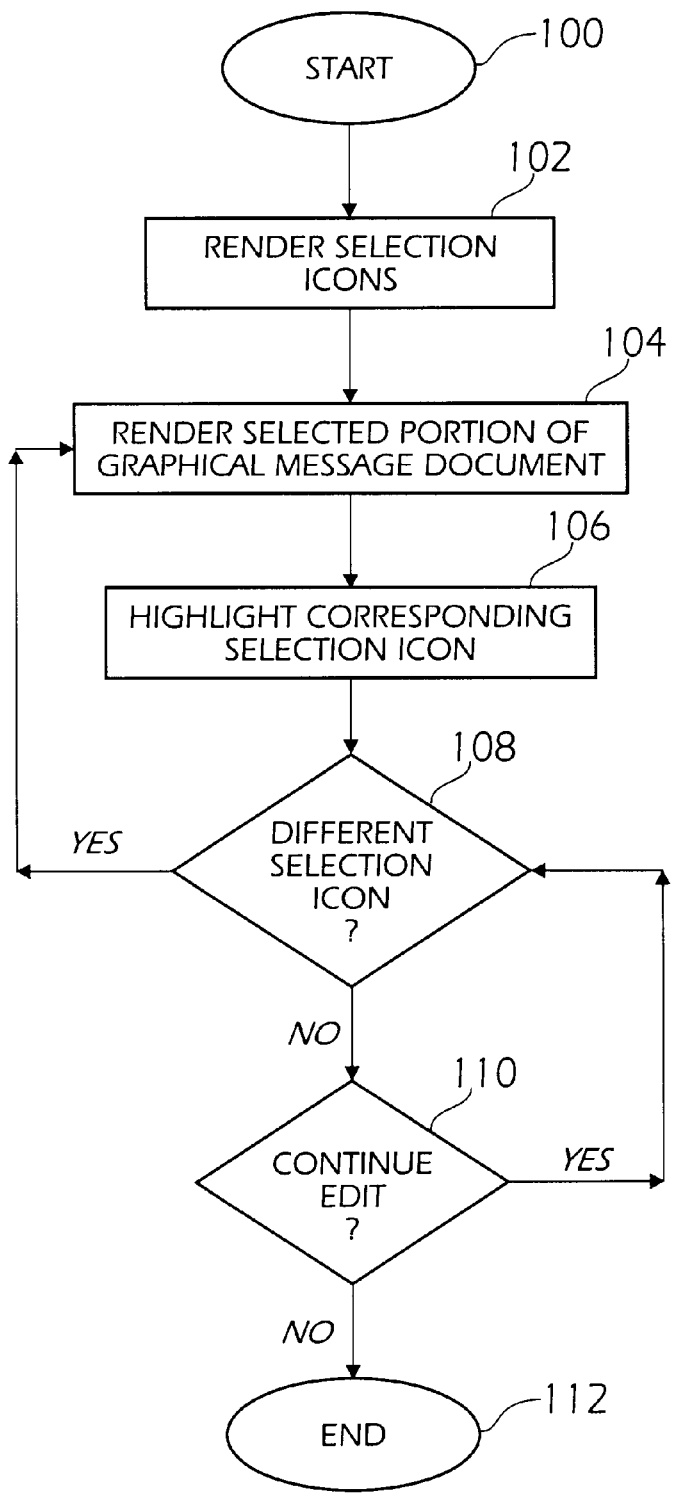
FIG. 5 is a flow diagram of a user interface method for graphical message document software according to the present invention.

FIG. 5 is a flow diagram showing a user interface method for graphical message document computer software according to the present invention. Graphical message documents include an arrangement of relatively simple text and graphics elements in the form of, for example, greeting cards, flyers, signs, or calendars. The following method is described with reference to creation of a side or french-fold greeting card, but is similarly applicable to other graphical message documents.

Start block 100 indicates the start of the user interface method of the present invention in connection with a graphical message document editing process.

Process block 102 indicates that a selection icon 52 for each of multiple portions of a graphical message document is rendered on display screen 50. In a preferred embodiment, each selection icon 52 represents a page or cover of a greeting card-type graphical message document, and each page or cover that is modifiable by the user has an associated selection icon. Each of selection icons 52 is separately selectable by a user.

Process block 104 indicates that a selected portion 54 of the graphical message document is rendered on display screen 50. Selected portion 54 corresponds to one of selection icons 52. Selected portion 54 may be selected by the user or a default portion selected automatically by the graphical message document software.

Process block 106 indicates that selection icon 52c corresponding to selected portion 54 of the graphical message document is modified with highlighting 56 to identify selected portion 54.

Decision block 108 represents an inquiry as to whether a user selects a different one of selection icons 52. If a user selects a different one of selection icons 52, decision block 108 returns to process block 104, and otherwise proceeds to decision block 110.

Decision block 110 represents an inquiry as to whether the graphical message document editing process is continuing. If the graphical message document editing process is continuing, decision block 110 returns to decision block 108, and otherwise proceeds to end block 112.

It will be appreciated that many of the steps of FIG. 3 preferably are performed simultaneously or in different orders. For example, the steps of process blocks 102 and 104 may be performed simultaneously or with process block 104 preceding process block 102. Moreover, it will be appreciated that these steps are performed by a computer system 20 in response to corresponding computer-executable instructions stored in memory system 24.

Having described and illustrated the principles of our invention with reference to a preferred embodiment, it will be recognized that the preferred embodiment can be modified in arrangement and detail without departing from such principles. It should be understood that the-programs, processes, or methods described herein are not related or limited to any particular type of computer apparatus, unless indicated otherwise. Various types of general purpose or specialized computer apparatus may be used with or perform operations in accordance with the teachings described herein. Elements of the preferred embodiment shown in software may be implemented in hardware and vice versa.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. A computer-readable, memory storing computer-executable instructions for providing a user interface to a graphical message document computer application for creating a graphical message document having plural portions being arranged in a particular spatial relationship in the document comprising:

computer-executable instructions for rendering simultaneously a selection icon for each of plural portions of the graphical message document, each of the selection icons being associated with one of the plural portions and being separately selectable by a user; each selection icon comprising, of itself and independently of any other icons and any alphanumeric characters, a graphical representation of a relative position of the associated one of the plural portions within the particular spatial relationship.

2. The memory of claim 1 further comprising:

computer-executable instructions for detecting user selection of a selection icon for a first one of the plural portions of the graphical message document; and computer-executable instructions for distinguishing the selection icon of the first one of the plural portions of the graphical message document responsive to the user selection of the selection icon.

3. The memory of claim 2 further comprising computer-executable instructions for rendering the first one of the plural portions of the graphical message document simultaneously with the selection icons for the plural portions of the graphical message document.

4. The memory of claim 1 in which the graphical message document includes plural pages that correspond to the plural portions.

5. The memory of claim 4 further comprising computer-executable instructions for rendering simultaneously a selection icon for each and every one of the plural pages of the graphical message document.

6. The memory of claim 1 further comprising computer-executable instructions for rendering simultaneously with the selection icons a document icon for selectively rendering all portions of the graphical message document simultaneously, the document icon being selectable by the user separate from the selection icons.

7. The memory of claim 1 in which the graphical message document is a greeting card.

8. A computer-executed user interface method for selecting each of plural portions of a graphical message document, the plural portions being related each to the others in a specific spatial relationship within the graphical message document, the method comprising:

rendering a selection icon for each one of the plural portions of the graphical message document simultaneously with a first portion of the graphical message document, each selection icon being separately selectable by a user and comprising, of itself and independently of any other icons and any alphanumeric characters, a depiction of the specific spatial relationship of the one of the plural portions to the others of the plural portions; and distinguishing the selection icon of the first portion of the graphical message document to identify the first portion as rendered.

9. The method of claim 8 in which the graphical message document includes plural pages that correspond to the plural portions.

10. The method of claim 9 in which each of the selection icons corresponds to a single page of the graphical message document.

11. The method of claim 8 further comprising rendering simultaneously with the selection icons a document icon for selectively rendering plural portions of the graphical message document simultaneously, the document icon being separately selectable by the user.

12. The method of claim 8 in which the graphical message document is a greeting card.

13. In a computer system having a computer processor and a user input device for delivering input to the computer processor, a display screen responsive to the computer processor for rendering display images comprising:

plural selection icon images each representing one of plural portions of a graphical message document and each, of itself and independent of any other icon images and any alphanumeric characters, graphically representing a physical relationship of the one of the plural portions of the graphical message document to the others of the plural portions of the graphical message document, one of the plural portions of the graphical message document being selected, and a document image of the selected one of the plural portions of the graphical message document.

14. The display screen of claim 13 further comprising a image highlighting of the selection icon image representing the first one of the plural portions of the graphical message document.

15. The display screen of claim 13 in which the graphical message document includes plural pages that correspond to the plural portions.

16. The display screen of claim 15 in which each of the selection icon images corresponds to a single page of the graphical message document.

17. The display screen of claim 15 further comprising a selection icon image for each and every one of the plural pages of the graphical message document.

18. The display screen of claim 15 further comprising a document icon representing all portions of the graphical message document simultaneously.

19. The display screen of claim 13 in which the graphical message document is a greeting card.

* * * * *

UNITED STATES PATENT AND TRADEMARK OFFICE
CERTIFICATE OF CORRECTION

PATENT NO.    : 5,956,033

DATED         : September 21, 1999

INVENTOR(S)   : Cynthia C. Tee et al.

It is certified that error appears in the above-identified patent and that said Letters Patent is hereby corrected as shown below:

| Col./Line | Error Reads | Should Read |
|---|---|---|
| 6/60 | computer-readable, | computer-readable |
| 7/3 | user; | user, |

Signed and Sealed this

Tenth Day of April, 2001

Attest:

NICHOLAS P. GODICI

*Attesting Officer*    *Acting Director of the United States Patent and Trademark Office*